United States Patent
Edwards et al.

(10) Patent No.: US 6,618,051 B1
(45) Date of Patent: Sep. 9, 2003

(54) SYSTEM AND METHOD FOR CREATING AND DISPLAYING REPRESENTATIONS OF HOLOGRAPHIC IMAGES

(75) Inventors: Eric Edwards, San Francisco, CA (US); Akira Shirakura, Tama (JP); Nobuhiro Kihara, Kawasaki (JP); Takahiro Toyoda, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/557,853

(22) Filed: Apr. 26, 2000

(51) Int. Cl.[7] .............................................. G06T 15/20
(52) U.S. Cl. ...................... 345/427; 345/475; 382/210; 359/23; 359/9
(58) Field of Search ................................. 345/856, 851, 345/427, 475, 852, 355; 382/210; 359/23, 24, 9

(56) References Cited

U.S. PATENT DOCUMENTS

| | | | |
|---|---|---|---|
| 4,541,010 A | | 9/1985 | Alston .......................... 358/44 |
| 4,751,583 A | * | 6/1988 | Levine ........................ 358/256 |
| 5,016,173 A | * | 5/1991 | Kenet et al. ................. 382/285 |
| 5,680,629 A | * | 10/1997 | Slayden et al. ............. 707/527 |
| 5,956,083 A | * | 9/1999 | Taylor et al. ............ 348/231.6 |
| 6,049,622 A | * | 4/2000 | Robb et al. .................. 345/810 |
| 6,108,440 A | * | 8/2000 | Baba et al. .................. 382/154 |
| 6,123,733 A | * | 9/2000 | Dalton ........................... 703/5 |
| 6,414,686 B1 | * | 7/2002 | Protheroe et al. ........... 345/474 |

FOREIGN PATENT DOCUMENTS

| | | | | |
|---|---|---|---|---|
| GB | 2307383 A | * | 5/1997 | |
| JP | 11327005 A | * | 11/1999 | ................. 345/473 |

OTHER PUBLICATIONS

Bill Fleming (Phototrealism Toolkit: ISBN: 0–471–25346–4): 1998; pp. 289–294.*
Microsoft Press Computer Dictionary: ISBN 1–57231–446–X; 1997; pp. 31 & 184.*
Foley et al. Computer Graphics: Principles and Practice. Section 21.1.3 Interpolation. Pp. 1060–0164. Addison–Wesley. 1996.*
Russ, J.C. The Image Processing Handbook, 2d ed. "Chapter 3: Morphing", CRC Press. 1994.*
Konig et al. A Volumetric Approach to Visualize Holographic Reconstructions. Proc. International Conf. on Information Visualization, 1999. Jul. 14–16, 1999. Pp. 68–72.*
Lesem & Hirsch, "Computer Synthesis Of Holograms For 3–D Display", Oct., 1968, pp661–pp674.

* cited by examiner

*Primary Examiner*—Mano Padmanabhan
(74) *Attorney, Agent, or Firm*—Gregory J. Koerner; Simon & Koerner LLP (57) ABSTRACT

A system and method for creating and displaying representations of holographic images comprises a display device, digital image data, a simulation module configured to create a representation of a holographic image and display the representation on the display device, and a processor configured to control the simulation module. The digital image data may include a sequence of images selected by a user by utilizing a selection module. An inspection module inspects the sequence of images for errors. An image sizing module manipulates the digital image data to conform to a size of a final stereogram, and a color module manipulates the digital image data to conform to a color of the final stereogram. A sequence repair module fills any gaps in the sequence of images. When the user determines that the representation is satisfactory, an image data formatter configures the digital image data to conform to requirements of a service provider. The formatted image data is then forwarded to the service provider for processing.

57 Claims, 11 Drawing Sheets

SYSTEM AND METHOD FOR CREATING AND DISPLAYING REPRESENTATIONS OF HOLOGRAPHIC IMAGES

BACKGROUND OF THE INVENTION

1. Field of the Invention

This invention relates generally to electronic imaging systems and relates more particularly to a system and method for creating and displaying representations of holographic images.

2. Description of the Background Art

A hologram is a recordation of an interference pattern created by the interaction of two light sources which are usually coherent light sources such as lasers. A hologram may be used to record a 3-dimensional image or an amount of motion. Holographic images are typically produced using specialized equipment that is often cumbersome and expensive to assemble and operate. Hologram-producing equipment typically must be located and secured to eliminate vibrations. These limitations have made it difficult for individuals to have holographic images of themselves, their family, their pets, or other personal subject matter. Organizations and small businesses may also find the costs of producing holograms for marketing purposes prohibitive.

Recent developments in holographic technology have made it possible to create holographic images (holograms and holographic stereograms) from digital video data. Digital holographic printers are able to produce holographic prints using captured images from digital cameras, video cameras, and computer-generated images. However, this new hologram-producing equipment is also very expensive, making it impractical as a consumer product.

Individuals may obtain holograms and/or holographic stereograms of personal subject matter by submitting digital video data to a holography service provider. The service provider, much like a traditional photo-finisher, uses the digital video data to create a holographic stereogram, and then sends the finished product to the individual. Encouraging individuals to purchase holographic stereograms of personal subject matter is a consideration of holography service providers and manufacturers of stereogram-producing equipment and hologram-producing equipment.

A holographic stereogram looks quite different than a typical print of an image or a typical portion of motion video. Holographic stereograms are typically monochromatic, for instance red or green, and may be restricted to certain physical dimensions determined by the stereogram-producing equipment. Additionally, observation conditions of the finished stereogram are typically restrictive and determine how well the final product looks. Observation conditions may include the type of light source (e.g., sunlight, incandescent lamp, fluorescent lamp), distance from light source, distance from a view point, size of the light source, parallax of the hologram (e.g., horizontal, vertical, full), and angle of the light source.

The look of a stereogram also may depend on whether the light source, the view point, or the stereogram itself is moved while observing the stereogram. Further, when a stereogram is produced from a series of images that include motion, the final product depends on the speed of the motion. If the motion progresses too quickly, the final stereogram may appear blurred or distorted.

Thus, a consumer usually does not have a clear idea of how a hologram or stereogram will look prior to receiving the finished product. After a consumer has received a finished product, the stereogram may not look very good even though it is not defective. The problem may be poor viewing conditions and/or the degree of motion. This uncertainty may cause consumers to be hesitant about purchasing holograms or stereograms derived from digital image data.

Thus, encouraging consumers to purchase holograms or stereograms derived from digital image data remains a consideration of holography service providers and manufacturers of hologram-producing and stereogram-producing equipment.

SUMMARY OF THE INVENTION

In accordance with the present invention, a system and method are disclosed for creating and displaying representations of holographic images. In one embodiment, the invention may include a display device, digital image data, a simulation module that creates a representation of a stereogram or hologram using the digital image data and displays the representation on the display device, and a processor configured to control the simulation module.

In one embodiment, a user preferably selects a sequence of images using a selection module. An inspection module then preferably inspects the sequence of images for errors or problems. If errors or problems are present, the user may be prompted to reselect the sequence of images. When an error-free sequence of images is selected, a sizing module may manipulate the sequence of images to conform to a size of a finished stereogram, and a color module preferably manipulates the sequence of images to conform to a color of the final stereogram. A sequence repair module then may fill any gaps in the sequence of images using video morphing techniques.

The simulation module preferably uses the sized and colored image data to create a representation of a holographic image under specific observation conditions, and then displays the representation to the user on the display device. The user may manipulate the representation on the display device to simulate the multi-dimensional effects of moving the final stereogram in 3-dimensional space. The user may also manipulate the representation on the display device to simulate the observation conditions and/or degree of motion. In one embodiment, the final stereogram is a horizontal parallax stereogram and the representation is manipulated from left to right to simulate the stereogram.

When the user determines that the representation of the holographic image is acceptable, an image data formatter preferably configures the sequence of images to conform to the requirements of a service provider. The formatted sequence of images may then be forwarded to the service provider for processing into a final stereogram. The formatted image data may be forwarded to the service provider via a network, or may be stored in a removable memory and physically transported to the service provider.

The digital image data may include captured image data, for example, images captured with a digital camera, video camera, or scanner. Alternatively, the digital image data may include computer-generated data, for example, a logo or animation. The system of the present invention may be embodied in a general-purpose computer, a digital camera, video camera, or any other appropriate electronic device. The present invention thus efficiently and effectively creates and displays representations of holographic images.

DETAILED DESCRIPTION OF THE PREFERRED EMBODIMENT

The present invention relates to an improvement in electronic imaging systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

A system and method for creating and displaying representations of holographic images includes a display device, digital image data, a simulation module configured to create a representation of a holographic image and display the representation on the display device, and a processor configured to control the simulation module. The digital image data may include a sequence of images selected by a user by utilizing a selection module. An inspection module preferably inspects the sequence of images for errors. An image sizing module then may manipulate the digital image data to conform to a size of a final stereogram, and a color module preferably manipulates the digital image data to conform to a color of the final stereogram. A sequence repair module may fill any gaps in the sequence of images. When the user determines that the representation is satisfactory, an image data formatter preferably configures the digital image data to conform to requirements of a service provider. The formatted image data may then be forwarded to the service provider for processing.

Figure 1:
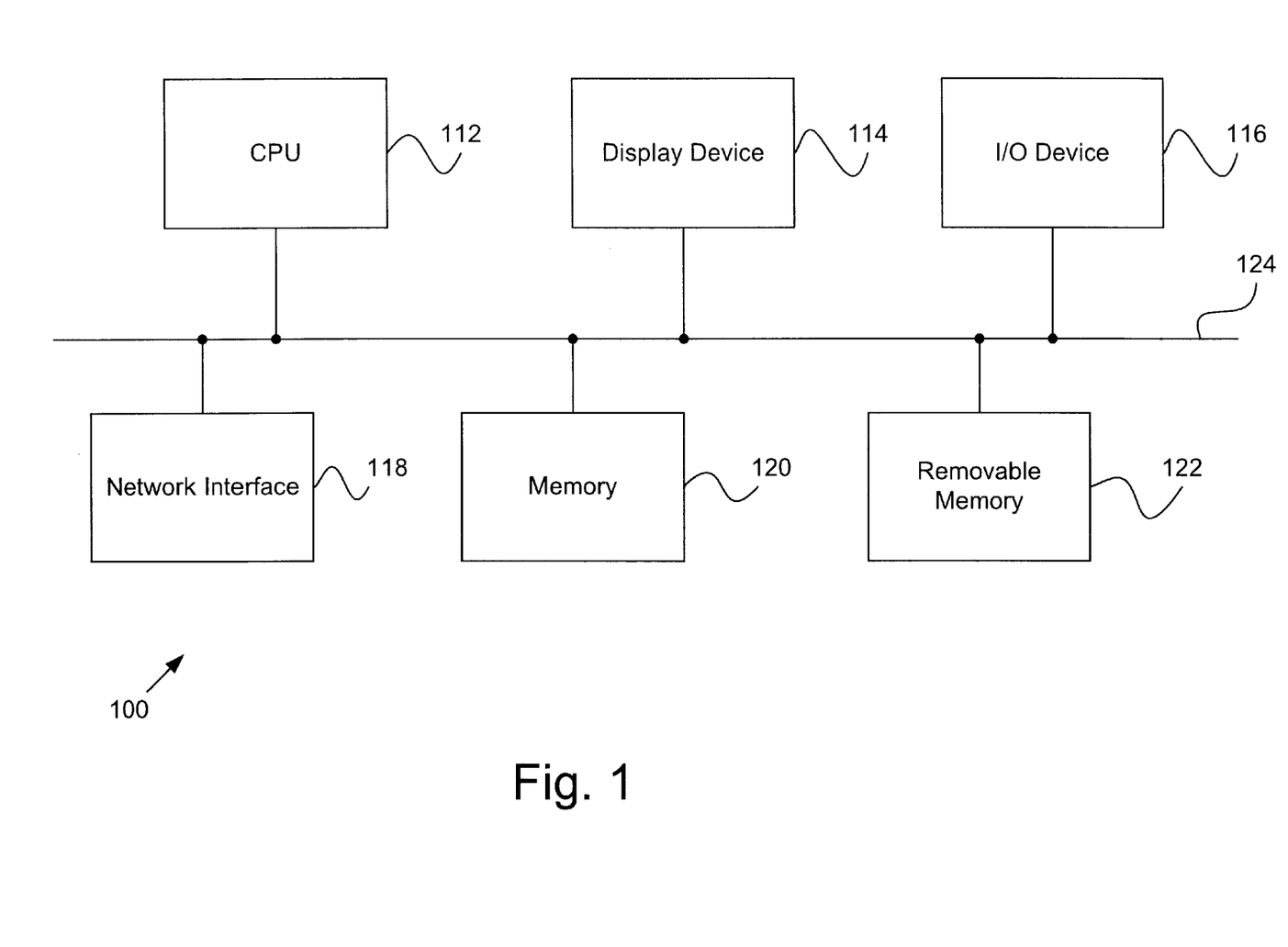
FIG. 1 is a block diagram for one embodiment of a computer system, according to the present invention.

Referring now to FIG. 1, a block diagram for one embodiment of a computer system 100 is shown, according to the present invention. Computer system 100 includes, but is not limited to, a central processing unit (CPU) 112, a display device 114, an input/output (I/O) device 116, a network interface 118, a memory 120, a removable memory 122, and a device bus 124. Computer system 100 may be embodied in a general purpose computer, laptop computer, personal digital assistant, video camera, digital camera, or any other appropriate electronic device.

CPU 112 may be implemented as any appropriate multi-purpose processor device to control software modules disposed in memory 120. Memory 120 may be implemented as any combination of storage devices, including, but not limited to, read-only memory, random-access memory, and various types of non-volatile memory, such as floppy discs or hard discs. Display device 114 may be implemented as any appropriate electronic display device, such as a CRT monitor or LCD screen. Display device 114 may also be implemented as a headset viewer (stereoscopic viewer) that includes a display screen for each eye.

I/O device 116 allows computer system 100 to exchange data with external devices, including, but not limited to, printers, scanners, digital cameras, and video cameras. I/O device 116 may conform to any interconnectivity standard, including Universal Serial Bus (USB) and IEEE-1394. Network interface 118 allows computer system 100 to exchange data with networks including, but not limited to, local area networks, wide area networks, and the Internet. Removable memory 122 may be implemented as any appropriate removable storage device, including, but not limited to, floppy discs, compact discs, magneto-optical storage devices, and solid-state memory devices.

Figure 2:
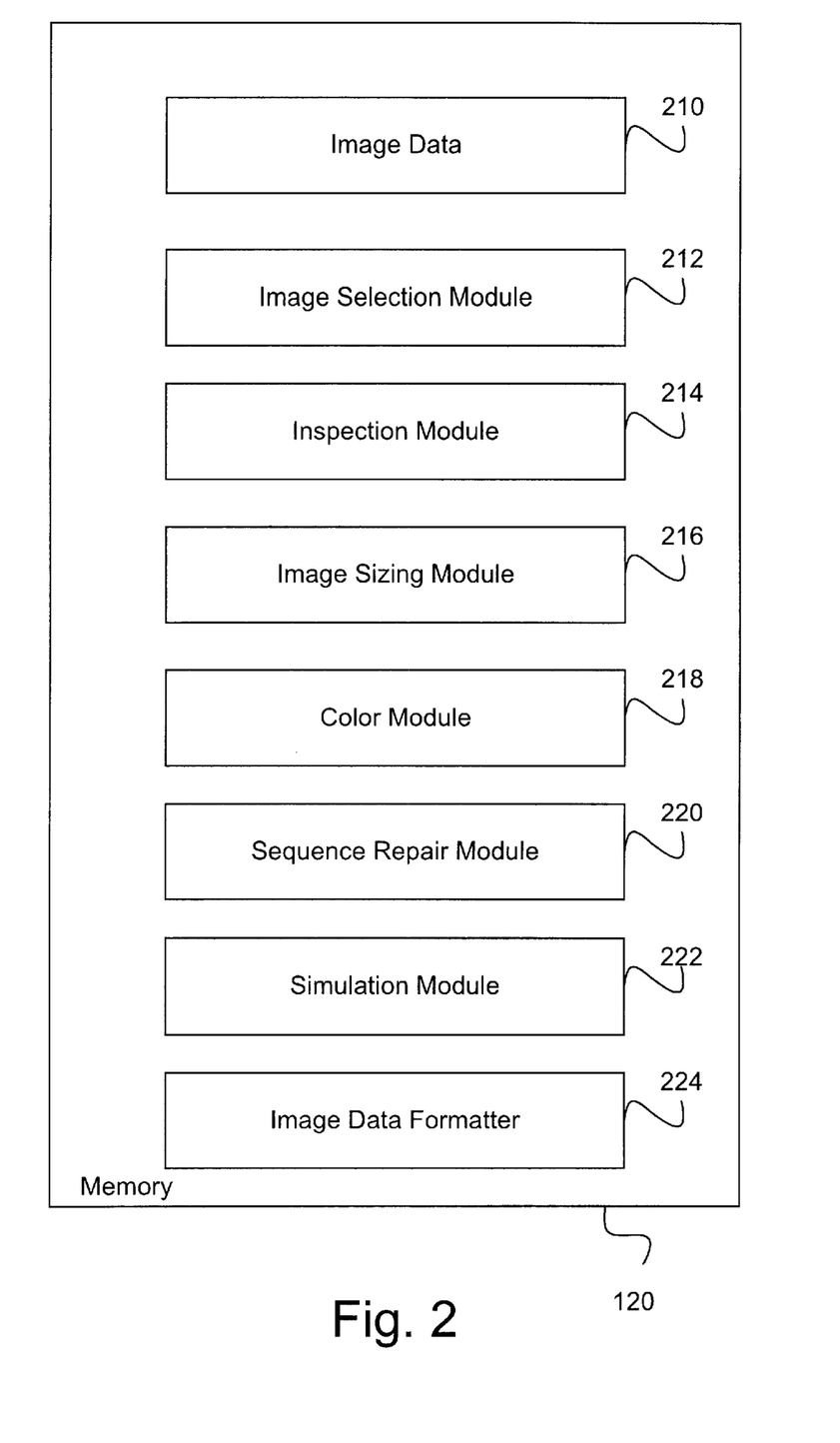
FIG. 2 is a block diagram for one embodiment of the memory of FIG. 1, according to the present invention.

Referring now to FIG. 2, a block diagram for one embodiment of the memory 120 of FIG. 1 is shown, according to the present invention. Memory 120 includes, but is not limited to, image data 210, an image selection module 212, an inspection module 214, an image sizing module 216, a color module 218, a sequence repair module 220, a simulation module 222, and an image data formatter 224.

Image data 210 preferably includes digital image data that may be embodied as JPEG images, MPEG images, GIF files, bitmap files, or any other digital image format. Image data 210 may originate from various sources, which is discussed below in conjunction with FIG. 5(a). The functionality of image selection module 212, inspection module 214, image sizing module 216, color module 218, sequence repair module 220, simulation module 222, and image data formatter 224 is discussed below in conjunction with FIG. 3.

Figure 3:
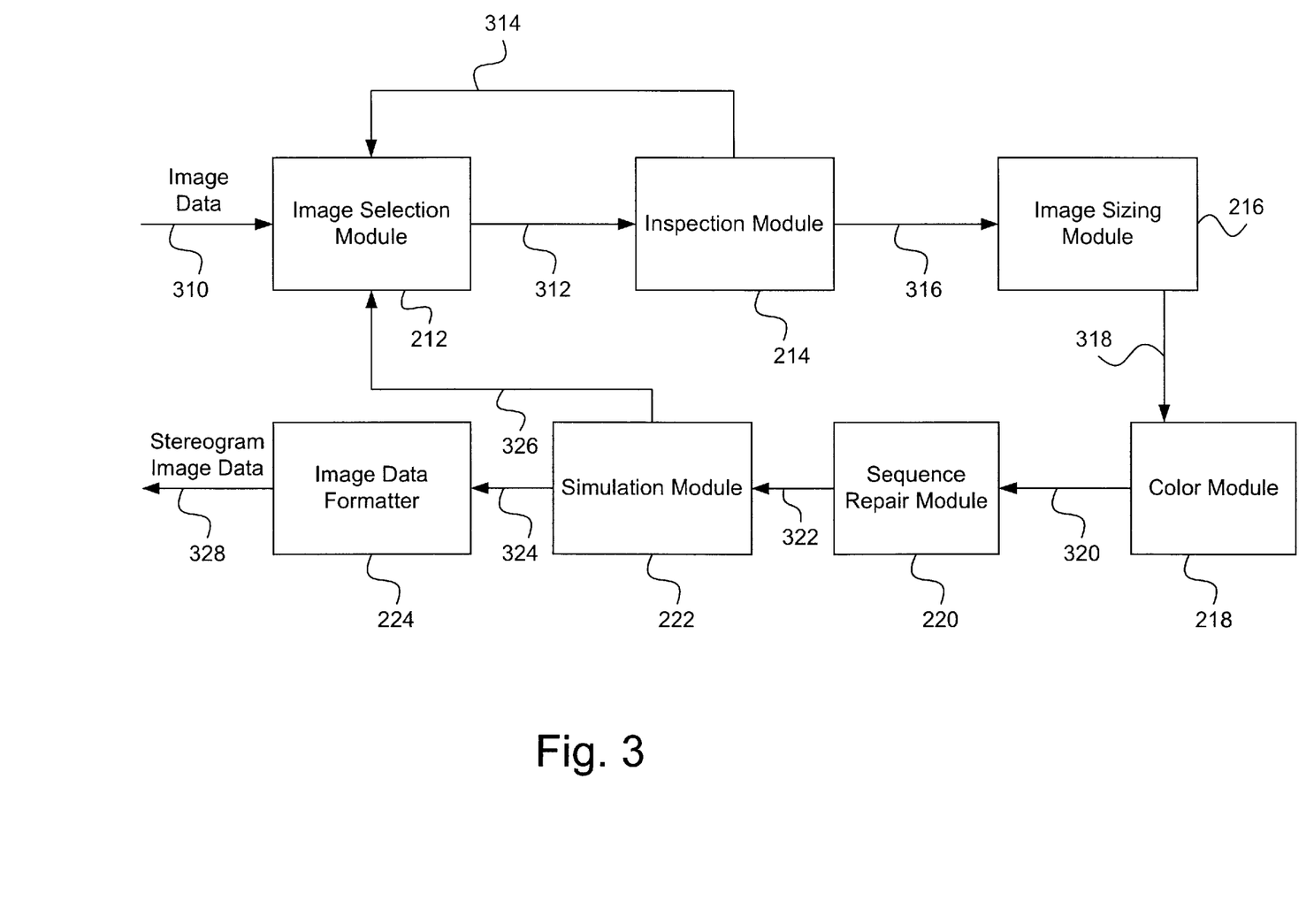
FIG. 3 is a block diagram for one embodiment of a system for displaying representations of holographic images, according to the present invention.

Referring now to FIG. 3, a block diagram for one embodiment of a system for displaying representations of holographic images is shown, according to the present invention. CPU 112 is preferably configured to 10 control the various software modules shown in FIG. 3. Digital video image data from an image source such as image data 210 or removable memory 122 may be input to image selection module 212 via path 310.

Image selection module 212 allows a user to select a sequence of images that may be used by a service provider to create a holographic stereogram. Although holographic stereograms (stereograms) are discussed herein, the service provider may also use the image to create other products, such as lenticular stereograms and holograms.

In one embodiment, image selection module 212 may present a series of images on display device 114 in a storyboard fashion, wherein a user selects the desired images by highlighting them. In another embodiment, image selection module 212 may prompt the user to select a starting point in a segment of motion video. Image selection module 212 then may identify a predetermined number of frames of video after the starting point as the sequence of images for the stereogram.

The number of images required by the service provider to produce the final stereogram determines the number of images selected by image selection module 212. The user may have several options for the number of images, depending upon the capabilities and product offerings of the service provider. Alternatively, the user may select a beginning image and an ending image, and video morphing techniques may be used to create a predetermined number of intermediate images to complete the sequence.

The selected images are forwarded to inspection module 214 via path 312. Inspection module 214 preferably determines whether there are any problems or errors in the sequence of images that will adversely affect the final stereogram. For example, a problem that would typically affect the smooth flow of motion in a final stereogram is large jumps in the sequence of images. Another problem may be less severe jumps, or jitters, in the sequence of images. Errors may be due to the user inadvertently selecting images that do not correspond to the other images in the sequence.

In one embodiment, inspection module 214 plays back the images to the user on display device 114, and the user identifies any problems. In another embodiment, inspection module 214 inspects the sequence for problems and presents the results to the user, with suggestions for correcting the problems. In still another embodiment, inspection module 214 inspects the sequence of images for problems, and uses an artificial intelligence module to automatically correct the problems. If inspection module 214 determines that there is a problem or defect in the sequence of images, then the selected images are returned to image selection module 212 via path 314, where the user may reselect the sequence of images or may accept the sequence of images as it stands. Errors or problems that may not be correctable by reselecting images may be correctable by sequence repair module 220, which is discussed below.

When a satisfactory sequence of images has been selected, the images are then preferably forwarded to image sizing module 216 via path 316. Image sizing module 216 then may size the selected images to the size of the final stereogram. The size of the final stereogram may be predetermined by the service provider, or may be selected by the user from a range of choices determined by the service provider. The sized images are then preferably forwarded to color module 218 via path 318.

In the FIG. 3 embodiment, color module 218 preferably manipulates the color of the sized images to match the color of the final stereogram. Typical stereograms are monochromatic, for instance red or green. However, representations of full color stereograms are within the scope of the present invention. The service provider typically determines the color options available to the user. Observation conditions selected by the user may also affect the size and color of the holographic representation. The sized and colored images may then be forwarded to sequence repair module 220 via path 320.

Sequence repair module 220 preferably inspects the sequence of images for gaps or missing images. Gaps in the sequence of images may occur when the original data does not contain a sufficient number of images to create the stereogram. For example, a portion of motion video may not contain a sufficient number of frames to satisfy the service provider's requirements for a stereogram, and sequence repair module 220 may then create frames to fill the gaps. In another example, two side views and a front view of an object may be used to create a 180-degree stereogram of the object by interpolating the missing views.

In the FIG. 3 embodiment, sequence repair module 220 may use morphing or "tweening" techniques to fill any gaps in the sequence of images. In another embodiment of sequence repair module 220, morphing techniques may be used to transform a single image, or a beginning image and an ending image, into a sequence of images that will be used to create a stereogram. Sequence repair module 220 may utilize any appropriate video morphing techniques.

Simulation module 222 preferably presents a representation of a final stereogram to the user via display device 114. The representation is preferably displayed in the size and color of the final stereogram under specific observation conditions. Simulation module 222 and the representation of the holographic image are further discussed below in conjunction with FIGS. 6(a) and 6(b).

If the representation of the holographic image is acceptable to the user, then the selected images may be forwarded to image data formatter 224 via path 324. If the representation of the holographic image is not acceptable to the user, then the images may be returned via path 326 to image selection module 212, where the user may adjust the selection of images. Image data formatter 224 preferably formats the images according to the requirements of the service provider. Formatter 224 may also attach various data to the image file, such as user identification and number of stereograms desired.

Image data formatter 224 may also attach a thumbnail image to the image file. After a final stereogram is produced, the thumbnail image may simplify identification of the original image data used to create the stereogram. For example, if the image data contains a series of images of a face, from left to right, a front view image may be selected as a thumbnail image. Image data formatter 224 may resize the front view image to a size of the thumbnail image.

The stereogram image data is then preferably output via path 328 for storage in image data 210 or in removable memory 122. Alternatively, the stereogram image data may be transmitted directly to the service provider via network interface 118.

Figure 4:
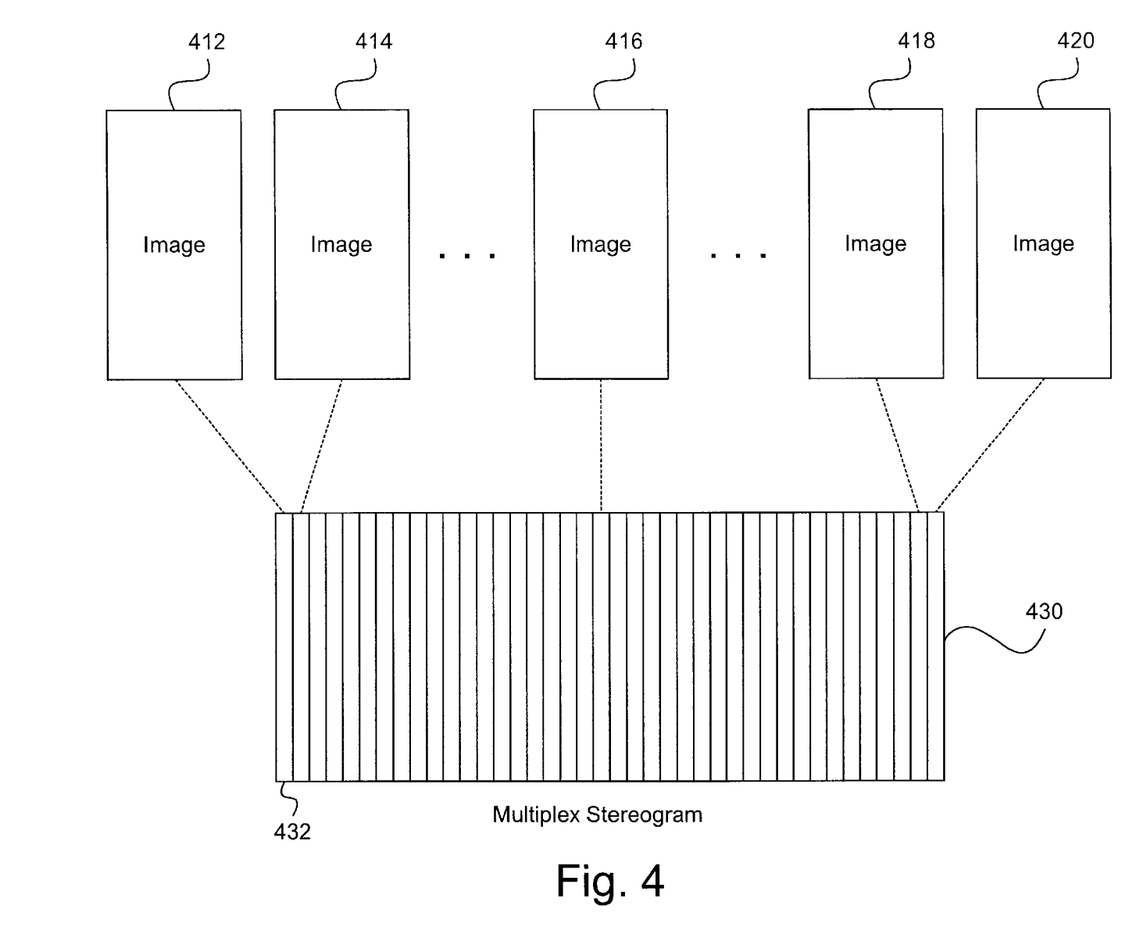
FIG. 4 is a diagram for one embodiment of a multiplex stereogram.

Referring now to FIG. 4, a diagram for one embodiment of a multiplex stereogram 430 is shown. Multiplex stereogram 430 is formed using a series of images 412–420. Multiplex stereogram 430 may be considered to be image data stored holographically. Each image 412–420 corresponds to a horizontal parallax slit stereogram. For instance, image 412 corresponds to slit stereogram 432. Although a horizontal parallax stereogram is shown, other forms of multiplex stereograms are within the scope of the present invention.

In one embodiment, images 412–420 may represent a 180-degree view of an object. Image 412 may represent a left-side view of the object, image 416 may represent a front-side view of the object, and image 420 may represent a right-side view of the object. Thus stereogram 430 reproduces a 180-degree view of the object when viewed from left to right.

In another embodiment, images 412–420 may represent a portion of motion video. Image 412 may represent a starting position of the motion, image 416 may represent an intermediate position of the motion, and image 420 may represent the ending position of the motion. Thus, stereogram 430 reproduces the motion when viewed from left to right.

For example, stereogram 430 may represent a human face. When stereogram 430 is viewed at an extreme left angle, the right-hand side of the face is shown. When stereogram 430 is viewed at an extreme right angle, the left-hand side of the face is shown. Turning stereogram 430 from left to right changes the angle of the incident light, which is preferably from a point light source, but may be incandescent light. An interference pattern stored on stereogram 430 is illuminated by the incident light and recreates a second light source to form the 3-dimentional image of the human face.

Figure 5A:
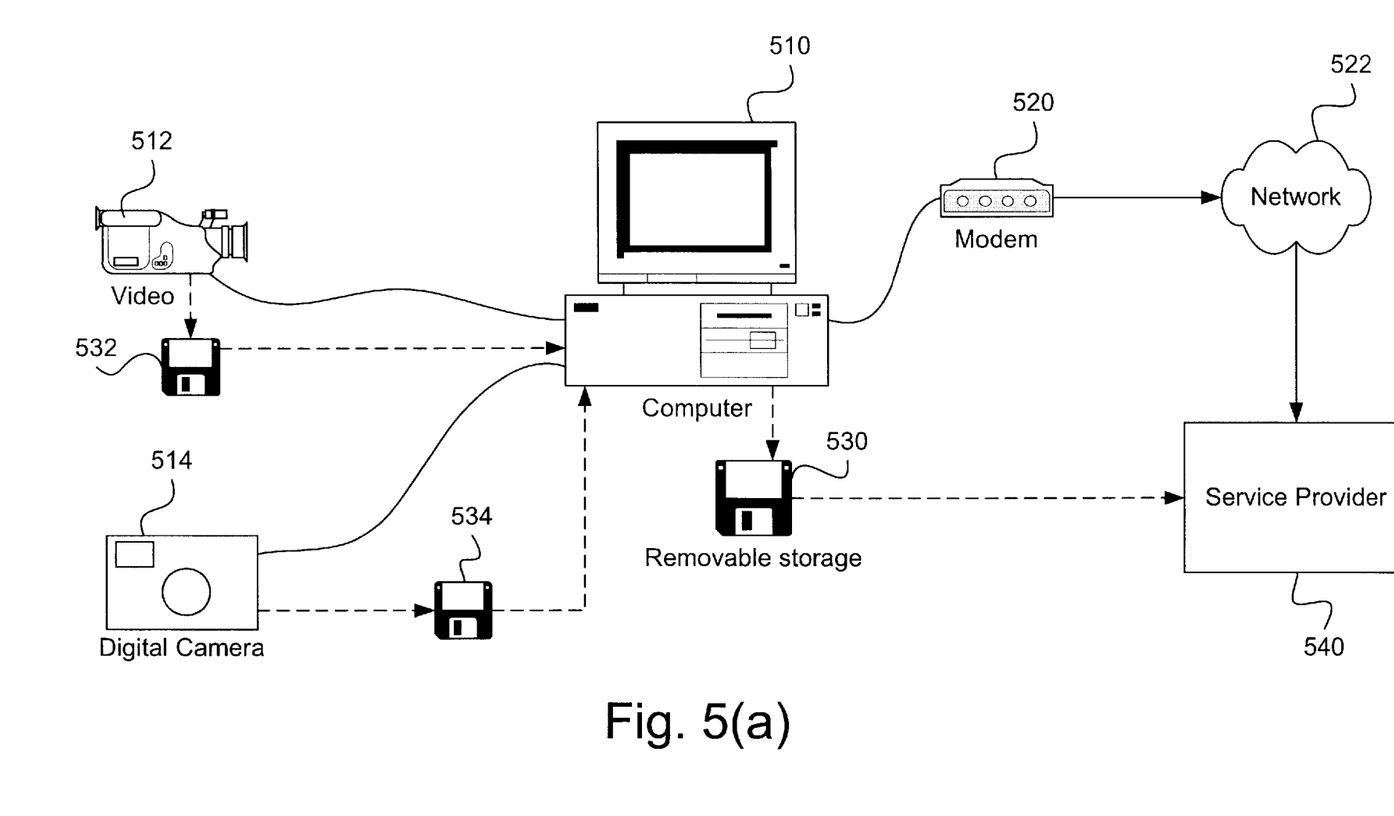
FIG. 5(a) is a diagram for one embodiment of a system for creating and representing holographic images, according to the present invention.

Referring now to FIG. 5(a), a diagram for one embodiment of a system for creating and representing holographic images is shown, according to the present invention. In the FIG. 5(a) embodiment, the modules discussed above in conjunction with FIG. 3 are disposed in a computer 510. Digital video image data may be produced by a video camera 512, a digital camera 514, or other source, and input to computer 510. The data may be input into computer 510 via a direct connection such as an IEEE-1394 bus, or the data may be stored in removable storage 532 or 534 and then loaded into computer 510. Although a floppy disc is shown in FIG. 5(a), any appropriate form of removable storage 532, 534 may be implemented in video camera 512 and digital camera 514. Digital video image data may also originate from computer 510 in various forms, such as computer-generated logos, 3-dimensional pictures, and animation.

Once the sequence of images has been selected and approved by the user, and any gaps have been filled, the formatted data may be forwarded to a service provider 540. In one embodiment, the data is forwarded to service provider 540 via modem 520 and network 522. In another embodiment, the data is stored on a form of removable storage 530, and physically transported to service provider 540. Although a floppy disc is shown in FIG. 5(a), removable storage 530 may be implemented as any appropriate embodiment of removable storage, such as compact discs, magneto-optical media, and solid-state memory devices.

Figure 5B:
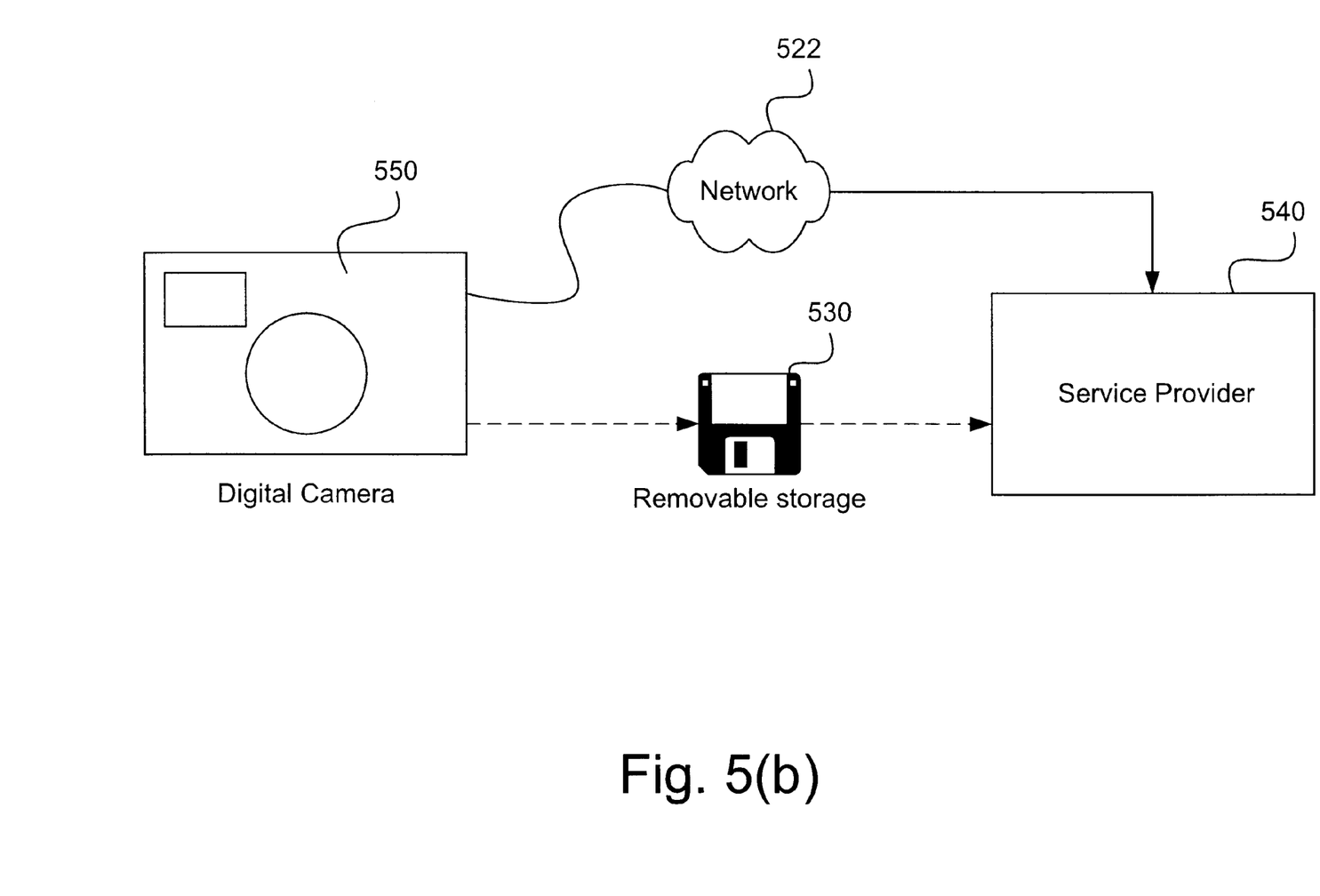
FIG. 5(b) is a diagram for one embodiment of a system for creating and representing holographic images, according to the present invention.

Referring now to FIG. 5(b), a diagram for another embodiment of a system for creating and representing holographic images is shown, according to the present invention. In the FIG. 5(b) embodiment, the modules discussed above in conjunction with FIG. 3 are implemented in a digital camera 550 that also includes a display device. In FIG. 5(b), digital camera 550 may be directly connected to network 522, whereby stereogram image data may be transmitted to service provider 540. Digital camera 550 may also store stereogram image data on removable storage 530, which may then be physically transported to service provider 540.

Figure 6A:
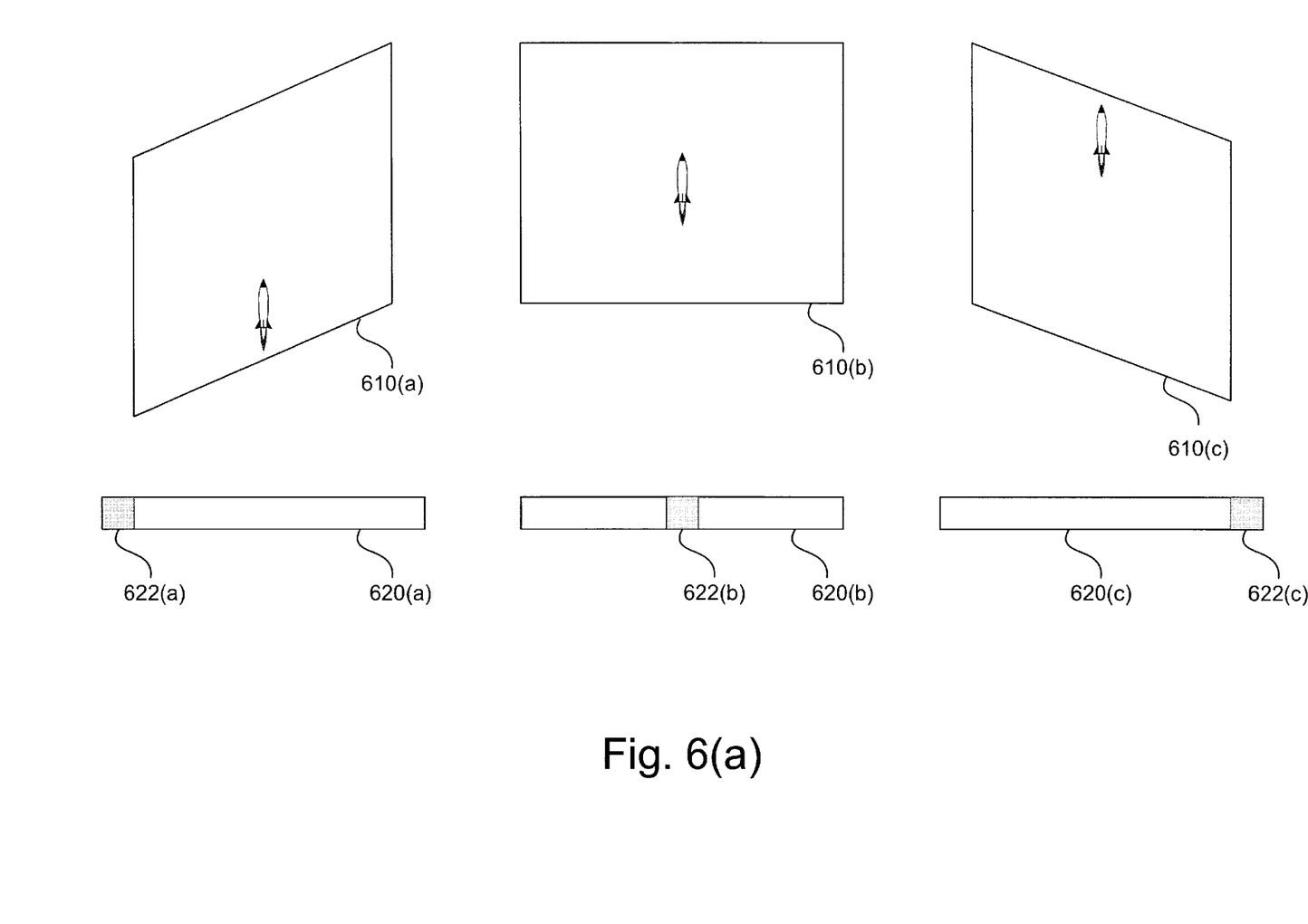
FIG. 6(a) is a diagram of three views of a representation of a holographic image, according to one embodiment of the present invention.

Referring now to FIG. 6(a), a diagram of three views of a representation of a holographic image is shown, according to one embodiment of the present invention. Each view is preferably presented to the user via display device 114 (FIG. 1). Each view includes a representation 610 and a slider bar 620. Representation 610 is sized and colored to match the appearance of the final stereogram, and includes the sequence of images selected by the user.

In the FIG. 6(a) example, simulation module 222 generates representation 610, which simulates a stereogram that shows a set of motion images of a rocket ascending. The final multiplex stereogram will show the motion of the rocket as the stereogram is turned from left to right. The motion of the rocket is preferably simulated by representation 610 when the user moves the position of a cursor 622 along slider bar 620.

For example, when cursor 622(a) is positioned to the far left of slider bar 620(a), the starting point of the motion with the rocket at its lowest level is shown in representation 610(a). When cursor 622(b) is positioned in the middle of slider bar 620(b), the midpoint of the rocket's motion is shown in representation 610(b). When the cursor 622(c) is positioned to the far right of slider bar 620(c), the ending point of the motion with the rocket at its highest level is shown in representation 610(c). Thus, by moving cursor 622 along slider bar 620, the user may simulate the multidimensional effect of moving the final stereogram in 3-dimensional space. Although a cursor and slider bar are shown, other means for controlling the multi-dimensional effect of moving of a stereogram in 3-dimensional space are within the scope of the present invention.

In FIG. 6(a), representation 610 shows a segment of motion. However, representations that show multi-dimensional images are within the scope of the present invention. For example, when cursor 622 is positioned to the far left of slider bar 620, a representation may show a far-left view of a 3-dimensional still image. Similarly, when cursor 622 is positioned to the far right of slider bar 620, the representation may show a far-right view of a 3-dimensional still image. Thus, representation 610 may show the multi-dimensional effect of moving a final stereogram in 3-dimensional space.

Figure 6B:
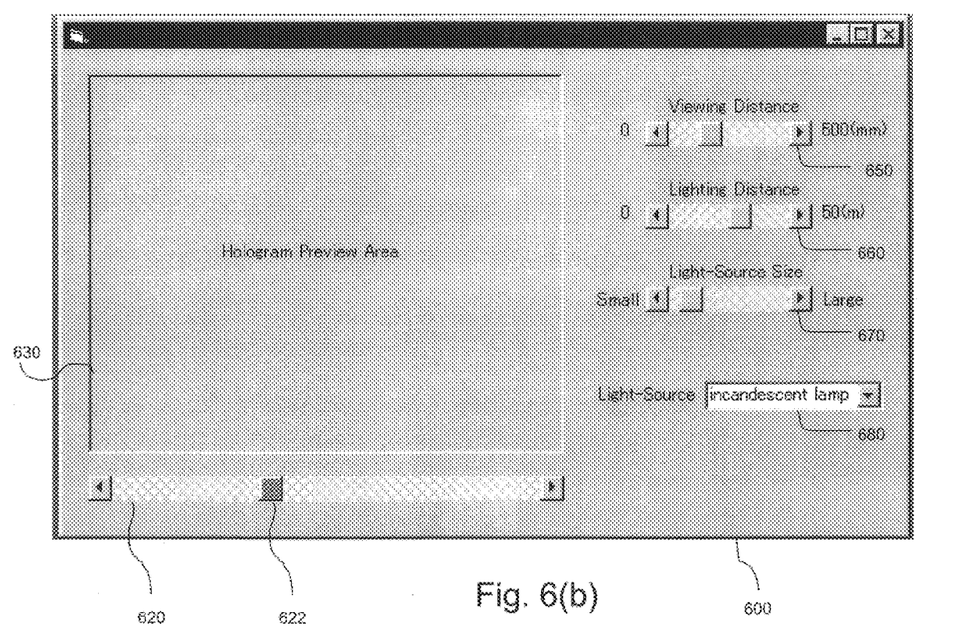
FIG. 6(b) is a view for one embodiment of a user interaction screen, according to the present invention.

Referring now to FIG. 6(b), a view for one embodiment of a user interaction screen 600 is shown, according to the present invention. User interaction screen 600 is displayed to a user on display device 114 (FIG. 1). User interaction screen 600 includes, but is not limited to, a hologram preview area 630, slider bar 620, a viewing distance control 650, a lighting distance control 660, a light source size control 670, and a light source selector 680.

Hologram preview area 630 presents representation 610 to the user. The user moves cursor 622 along slider bar 620 to simulate the multi-dimensional (holographic) effect of moving a final stereogram in 3-dimensional space. The user may also adjust the observation conditions of the holographic representation. The user may select a light source using light source selector 680. The user may typically select from an incandescent lamp (shown), a fluorescent lamp, and sunlight. The size of the light source may be adjusted using light source size control 670.

Other adjustments to the observation conditions may be made using viewing distance control 650 and lighting distance control 660. Viewing distance control 650 shows a range of 0–500 millimeters; however, other distance ranges are within the scope of the present invention. Lighting distance control 660 shows a range of 0–50 meters; however, other distance ranges are within the scope of the present invention. When the user changes one or more of the observation conditions, simulation module 222 generates a new holographic representation 610, which may then be manipulated using slider bar 620 and cursor 622.

Figure 7A:
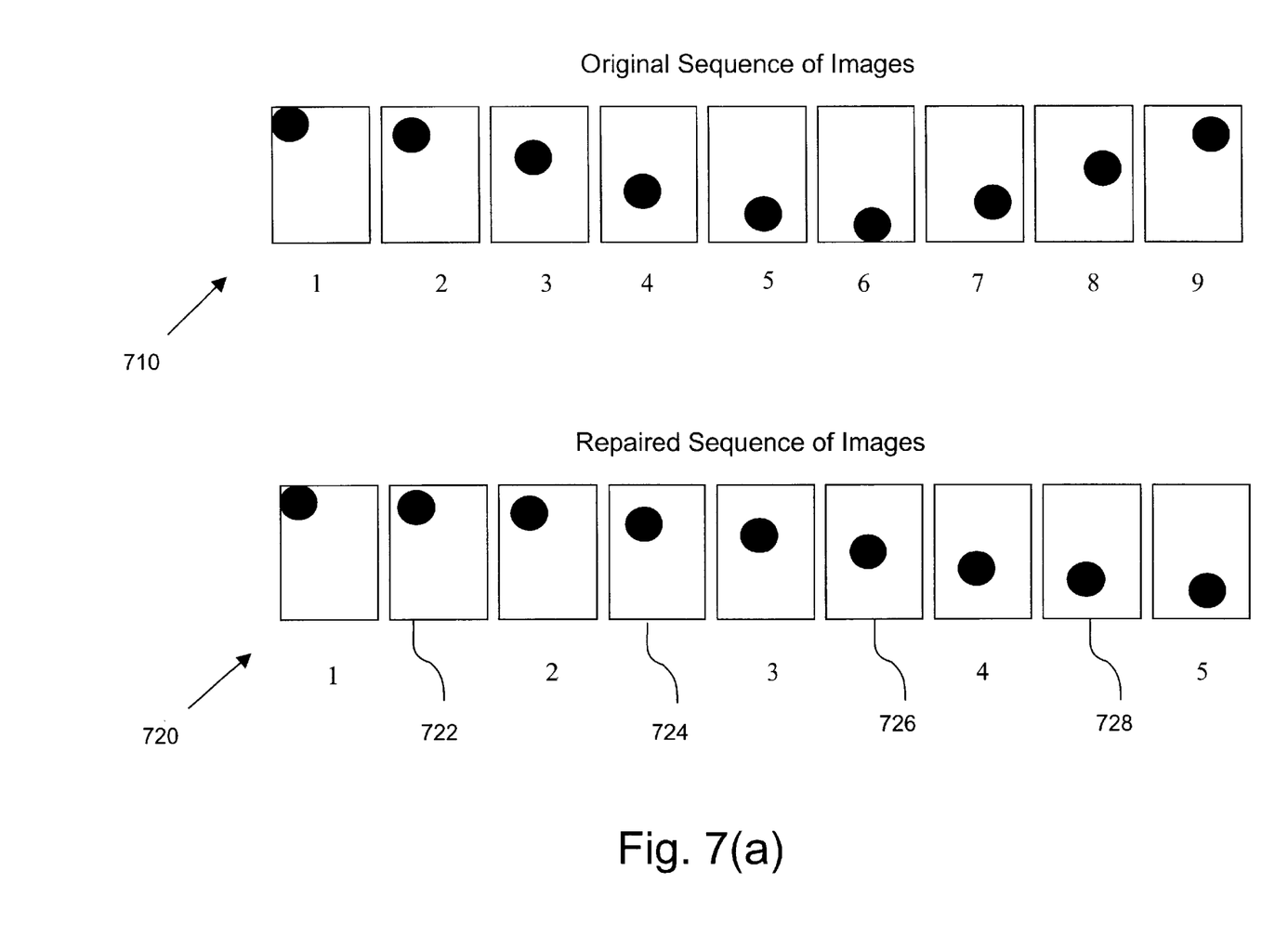
FIG. 7(a) is a diagram for one embodiment of sequences of images used in creating a stereogram, according to the present invention.

Referring now to FIG. 7(a), a diagram for one embodiment of sequences of images used in creating a stereogram is shown, according to the present invention. An original sequence 710 of images includes nine images showing motion of a ball. Although nine images are shown in FIG. 7(a), a typical sequence of images used in creating a stereogram includes significantly more than nine images.

A representation 610 utilizing sequence 710 may be blurred or distorted if the motion shown in sequence 710 is moving too fast. A representation may also be blurred if sequence 710 includes too much motion. Sequence repair module 220 may correct this problem by creating a repaired sequence 720 of images.

Repaired sequence 720 includes the first five images of sequence 710. Sequence repair module 220 generates images 722–728. Each generated image 722–728 is interpolated from a prior image and a subsequent image. For example, generated image 722 is interpolated from image 1 and image 2, and generated image 728 is interpolated from image 4 and image 5. As shown in FIG. 7(a), repaired sequence 720 displays only a portion of the motion shown by sequence 710. Such compromises in the amount of motion shown in a sequence of images may need to be made to produce a non-blurred final stereogram.

Figure 7B:
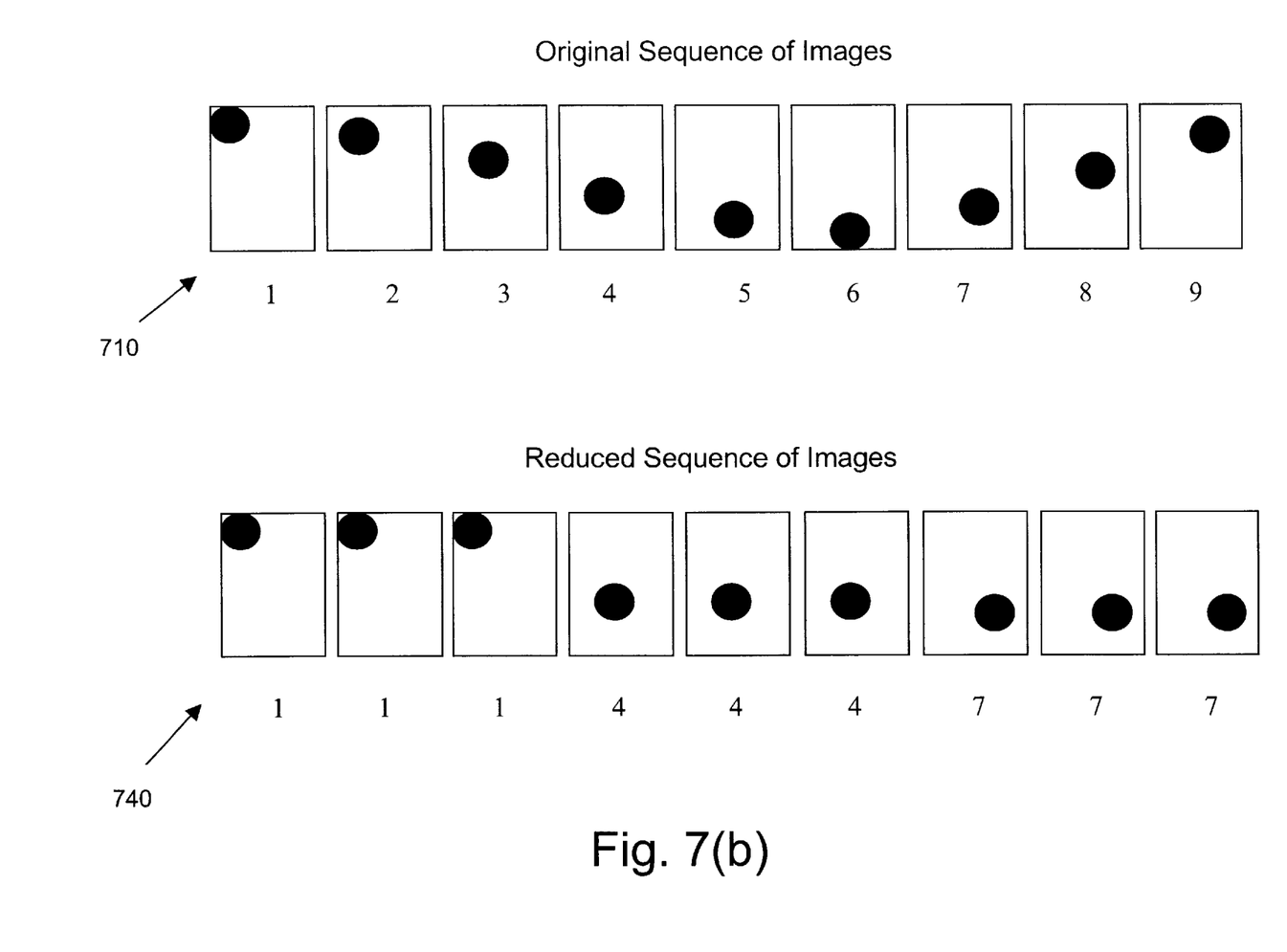
FIG. 7(b) is a diagram for one embodiment of sequences of images used in creating a stereogram, according to the present invention.

Referring now to FIG. 7(b), a diagram for one embodiment of sequences of images used in creating a stereogram is shown, according to the present invention. Sequence repair module 220 may also correct blurring and distortion in sequence 710 by producing a reduced sequence 740 of images.

Sequence repair module 220 may use a frame skipping technique to reduce the amount of motion shown by sequence 710. Sequence repair module 220 selects a subset of images from sequence 710, and skips, or disregards, the remaining images. The selected images are repeated to take the place of skipped images and thus the total number of images is maintained.

In FIG. 7(b), sequence repair module 220 selected images 1, 4, and 7 as the subset of images. Images 2, 3, 5, 6, 8, and 9 are skipped, and images 1, 4 and 7 are repeated to fill in for the skipped images to produce sequence 740. As in repaired sequence 720, reduced sequence 740 shows a smaller amount of motion than original sequence 710.

Figure 8:
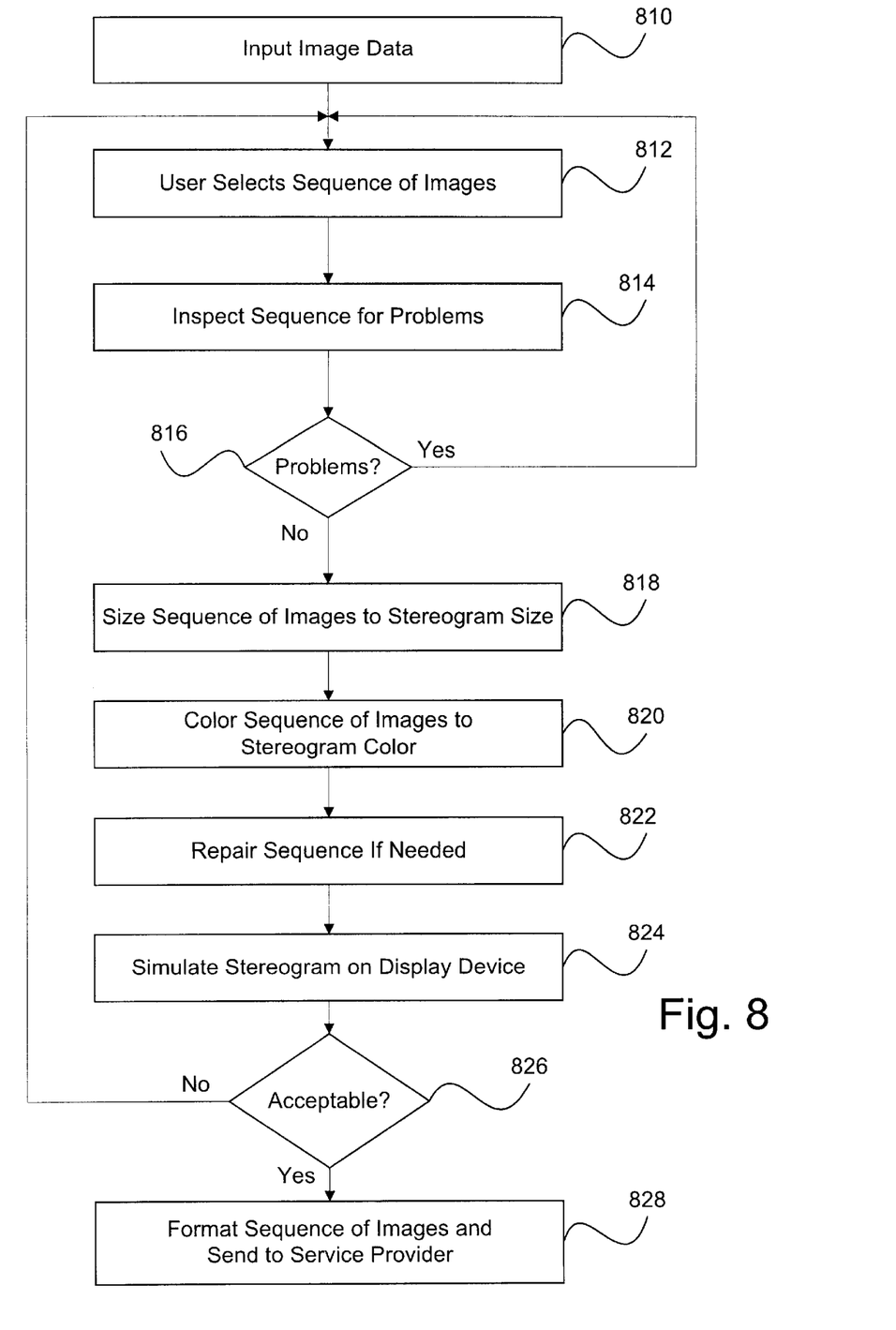
FIG. 8 is a flowchart of method steps for representing holographic images, according to one embodiment of the present invention.

Referring now to FIG. 8, a flowchart of method steps for representing holographic images is shown, according to one embodiment of the present invention. Initially, in step 810, a user preferably inputs digital image data into computer system 100. The image data may originate from an external image source such as a digital camera, video camera, or scanner. Alternatively, the image data may be computer-generated. Then, in step 812, the user preferably selects a sequence of images to be used to create a stereogram. The user may select a sequence of still images, a segment of motion video, or a beginning image and an ending image. The number of images in the sequence typically depends on the requirements and product offerings of a service provider.

In step 814, inspection module 214 preferably inspects the sequence of images for problems. For example, jumps and jitters may be caused by gaps in the sequence of images, or the user may have inadvertently selected an image that does not correspond to the other images in the sequence. In step 816, inspection module 214 determines whether there are errors or problems with the sequence of images. If there are problems, then the FIG. 8 method returns to step 812, where the user may reselect a sequence of images or accept the sequence of images as it stands. If there are no problems or the user approves the sequence, then, in step 818, image sizing module 216 preferably manipulates the size of each image in the sequence to the size of the final stereogram, which is typically determined by the service provider.

Then, in step 820, color module 218 may manipulate the color of the images in the sequence to the color of the final stereogram. Typically, the images are adjusted to be monochromatic. However, full color representations are within the scope of the present invention.

Next, in step 822, a sequence repair module 220 preferably fills any gaps in the sequence of images using appropriate techniques, such as video morphing. Then, in step 824, simulation module 222 preferably creates and displays a representation of the final stereogram to the user. The user may then advantageously manipulate the representation on display device 114 to simulate the effect of moving the final stereogram in 3-dimensional space. Thus, the representation shows the multi-dimensional effect of moving the final stereogram in 3-dimensional space.

Next, in step 826, the user may decide whether the sequence of images is acceptable based on the representation. If the sequence is not acceptable, then the FIG. 8 method returns to step 812, where the user may reselect images for the sequence. When an acceptable sequence of images has been selected, then, in step 828, the images in the sequence may be formatted to conform to the requirements of the service provider, and may then be forwarded to the service provider. The formatted images may be sent to the service provider using any appropriate means, such as a network, or the formatted images may be stored on a removable memory and physically transported to the service provider. The method of the present invention therefore effectively creates and displays representations of holographic images.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for creating and displaying a representation of a holographic stereogram, comprising:

digital image data generated from an image source, wherein said digital image data includes a sequence of images selected by a user, each of said images being individually selectable by said user;

a display device for displaying said representation;

a simulation module configured to simulate said holographic stereogram on said display device by using said digital image data; and a processor configured to control said simulation module.

2. The system of claim 1, further comprising an image sizing module configured to manipulate said digital image data to conform to a designated size of said holographic stereogram.

3. The system of claim 1, further comprising a color module configured to manipulate said digital image data to conform to a designated color of said holographic stereogram.

4. The system of claim 1, further comprising an inspection module configured to inspect said digital image data for errors.

5. The system of claim 1, further comprising a sequence repair module configured to inspect said digital data for errors.

6. The system of claim 5, wherein said sequence repair module fills gaps in said sequence of images.

7. The system of claim 6, wherein said sequence repair module uses image morphing techniques to fill gaps in said sequence of images.

8. The system of claim 1, wherein said simulation module displays said representation of a final stereogram on said display device.

9. The system of claim 8, wherein said representation shows a multi-dimensional effect of moving said final stereogram in three-dimensional space.

10. The system of claim 9, further comprising means for controlling said representation showing said multi-dimensional effect.

11. The system of claim 10, wherein said means for controlling said representation includes a slider bar and a cursor.

12. The system of claim 1, further comprising a stereogram image data formatter configured to format said digital image data to conform to requirements of a holography service provider to thereby produce formatted digital image data.

13. The system of claim 12, wherein said digital image data includes image data captured by a digital camera.

14. The system of claim 12, wherein said formatted digital image data is forwarded to said holography service provider via a network.

15. The system of claim 13, wherein said formatted digital image data is stored on a removable memory and said removable memory is transported to said holography service provider.

16. The system of claim 1, wherein said digital image data includes image data captured by a video camera.

17. The system of claim 1, wherein said digital image data includes computer-generated image data.

18. The system of claim 1, wherein said system is disposed in a general-purpose computer.

19. The system of claim 1, wherein said system is disposed in a digital camera.

20. A system for creating and displaying a representation of a holographic stereogram, comprising:
   a digital image data source, wherein said digital image data includes a sequence of images selected by a user, each of said images being individually selectable by said user;
   a selection module configured to select a sequence of images from said digital image data source;
   a simulation module configured to simulate said holographic stereogram using said sequence of images; and
   a display device configured to display said representation.

21. The system of claim 20, wherein said digital image data source is a digital camera.

22. The system of claim 20, further comprising an image sizing module configured to manipulate said digital image data to conform to a designated size of said holographic stereogram.

23. The system of claim 20, further comprising a color module configured to manipulate said digital image data to conform to a designated color of said holographic stereogram.

24. The system of claim 20, further comprising an image sizing module configured to manipulate said sequence of images to conform to a size of a stereogram.

25. The system of claim 20, further comprising a color module configured to manipulate said sequence of images to conform to a color of a stereogram.

26. A method for creating and displaying a representation of a holographic stereogram, comprising the steps of:
   generating digital image data, wherein said digital image data includes a sequence of images selected by a user, each of said images being individually selectable by said user;
   simulating said holographic stereogram by displaying said digital image data on a display device using a simulation module; and
   controlling said simulation module with a processor.

27. The method of claim 26, further comprising the step of sizing said digital image data to correspond to a designated size of said holographic stereogram.

28. The method of claim 26, further comprising the step of coloring said digital image data to conform to a designated color of said holographic stereogram.

29. The method of claim 26, further comprising the step of inspecting said digital image data for errors.

30. The method of claim 26, further comprising the step of repairing said sequence of images by filling any gaps in said sequence of images.

31. The method of claim 26, further comprising the step of repairing said sequence of images by filling any gaps in said sequence of images using morphing techniques.

32. The method of claim 26, wherein said simulation module displays said representation of a final stereogram on said display device.

33. The method of claim 32, wherein said representation shows a multi-dimensional effect of moving said final stereogram in three-dimensional space.

34. The method of claim 33, further comprising the step of controlling said representation showing said multi-dimensional effect.

35. The method of claim 34, wherein said representation showing said multi-dimensional effect is controlled using a slider bar and a cursor.

36. The method of claim 26, further comprising the step of formatting said digital image data to conform to requirements of a holography service provider to thereby produce formatted digital image data.

37. The method of claim 36, further comprising the step of forwarding said formatted digital image data to said holography service provider via a network.

38. The method of claim 36, further comprising the steps of storing said formatted digital image data in a removable memory, and transporting said removable memory to said holography service provider.

39. A computer-readable medium comprising program instructions for creating and displaying a representation of a holographic stereogram, by performing the steps of:
   generating digital image data, wherein said digital image data includes a sequence of images selected by a user, each of said images being individually selectable by said user;
   simulating said holographic stereogram by displaying said digital image data on a display device using a simulation module; and
   controlling said simulation module with a processor.

40. The method of claim 26, wherein said digital image data includes digital images captured by a digital camera.

41. The method of claim 26, wherein said digital image data includes digital images captured by a video camera.

42. The method of claim 26, wherein said digital image data includes computer-generated image data.

43. A system for creating and displaying a representation of a holographic stereogram, comprising:
   means for generating digital image data;
   means for simulating said holographic stereogram by displaying said digital image data on a display device using a simulation module; and
   means for controlling said simulation module.

44. A system for creating and displaying a representation of a holographic stereogram, comprising:
   an image source that is configured to provide digital image data corresponding to at least one photographic target;
   an image selection module with which a system user performs an image selection procedure for separately choosing individual images from said digital image data to form an image sequence corresponding to said holographic stereogram;

a simulation module configured to display said representation of said holographic stereogram upon a display device so that said individual images are displayed as corresponding individual holographic images; and stereogram adjustment means for manipulating said representation of said holographic stereogram on said display device in order to simulate a multi-dimensional visual effect of said holographic stereogram in three-dimensional space, to thereby allow said system user to evaluate whether said image sequence is satisfactory for providing to a holographic service provider to produce a hard copy of said holographic stereogram.

45. The system of claim 44 wherein said image selection module initially presents initial images from said image data upon said display device in a storyboard fashion, said system user then selecting desired ones of said initial images to form said image sequence.

46. The system of claim 44 wherein an inspection module is configured to analyze said image sequence for image formatting problems and image selection errors, said inspection module responsively indicating whether any of said image formatting problems and said image selection errors are present in said image sequence.

47. The system of claim 44 wherein said inspection module provides suggestions to said system user for correcting any of said image formatting problems and said image selection errors in said image sequence.

48. The system of claim 44 wherein said inspection module automatically corrects any of said image formatting problems and said image selection errors in said image sequence by utilizing an artificial intelligence module.

49. The system of claim 44 wherein a sequence repair module performs an image sequence repair procedure upon said image sequence when pre-determined detrimental image conditions exist.

50. The system of claim 49 wherein one of said pre-determined detrimental image conditions includes an image non-continuity condition that produces a motion gap exceeding a certain gap threshold amount between sequential ones of said individual images in said image sequence, said sequence repair module responsively interpolating additional images to fill said motion gap between said sequential ones of said individual images.

51. The system of claim 49 wherein said sequence repair module performs a frame skipping technique that removes certain of said individual images in said image sequence, and that then repeats remaining ones of said individual images in said image sequence.

52. The system of claim 49 wherein said sequence repair module interpolates all of said individual images between a first image and a last image in a 180 degree holographic stereogram sequence.

53. The system of claim 44 wherein said simulation module provides a user interaction screen upon said display device for viewing and manipulating said representation of said holographic stereogram, said user interaction screen including a hologram preview area, and a slider bar with which to stimulate said multi-demensional visual effect of said holographic stereogram in said three-demensional space.

54. The system of claim 53 wherein said user interaction screen includes a light source selector for selecting a light source for viewing said representation, said user interaction screen also including a light source size control, a viewing distance control, and a lighting distance control for manipulating viewing conditions of said representation upon said display device.

55. The system of claim 44 wherein said system user repeats said image selection procedure for separately choosing said individual images from said digital image data to form said image sequence whenever said system user decides that said image sequence is not satisfactory for providing to said holographic service provider.

56. The system of claim 44 wherein an image data formatter performs a data formatting procedure to convert said image sequence to format requirements of said holographic service provider, said image data formatter attaching a user identifier to said image sequence, said image data formatter also attaching a thumbnail image of one of said individual images to said image sequence for visually identifying said image sequence.

57. A system for creating and displaying a representation of a lenticular stereogram, comprising:

an image source that is configured to provide digital image data corresponding to at least one photographic target;

an image selection module with which a system user performs an image selection procedure for separately choosing individual images from said digital image data to form an image sequence corresponding to said lenticular stereogram;

a simulation module configured to display said representation of said lenticular stereogram upon a display device; and stereogram adjustment means for manipulating said representation of said lenticular stereogram on said display device in order to simulate a multi-dimensional visual effect of said lenticular stereogram in three-dimensional space, to thereby allow said system user to evaluate whether said image sequence is satisfactory for providing to a stereogram service provider to produce a hard copy of said lenticular stereogram.

* * * * *